United States Patent
Berlingieri et al.

(10) Patent No.: US 11,920,650 B2
(45) Date of Patent: Mar. 5, 2024

(54) COMPOSITE SPACER FOR LEAF SPRING SUSPENSION

(71) Applicant: Rassini Suspensiones, S.A. de C.V., Del. Miguel Hidalgo (MX)

(72) Inventors: Anthony Berlingieri, Plymouth, MI (US); Aaron Johnson, Westland, MI (US); James N. Zeimet, Commerce Township, MI (US); Juan Jose Wong, Coahuila (MX); Ramon Heberto Diego Guedea, Ann Arbor, MI (US)

(73) Assignee: Rassini Suspensiones, S.A. de C.V., Del. Miguel Hidalgo (MX)

( * ) Notice: Subject to any disclaimer, the term of this patent is extended or adjusted under 35 U.S.C. 154(b) by 5 days.

(21) Appl. No.: 17/760,974

(22) PCT Filed: Sep. 18, 2020

(86) PCT No.: PCT/IB2020/000759
§ 371 (c)(1),
(2) Date: Mar. 16, 2022

(87) PCT Pub. No.: WO2021/053395
PCT Pub. Date: Mar. 25, 2021

(65) Prior Publication Data
US 2022/0333660 A1   Oct. 20, 2022

Related U.S. Application Data (60) Provisional application No. 62/902,126, filed on Sep. 18, 2019.

(51) Int. Cl.
*F16F 1/368* (2006.01)
*B60G 11/04* (2006.01)
(Continued)

(52) U.S. Cl.
CPC ............ *F16F 1/3683* (2013.01); *B60G 11/04* (2013.01); *B60G 11/113* (2013.01);
(Continued)

(58) Field of Classification Search
CPC ...... F16F 1/3683; B60G 11/04; B60G 11/113; B60G 17/023; B60G 2204/121; B60G 2204/4502; B60G 2206/428
See application file for complete search history.

(56) References Cited

U.S. PATENT DOCUMENTS

| | | | | |
|---|---|---|---|---|
| 3,493,222 A | * | 2/1970 | Mathers | B60G 11/04 280/124.17 |
| 6,352,245 B1 | * | 3/2002 | Norden | B60G 11/04 267/52 |

(Continued)

FOREIGN PATENT DOCUMENTS

CN   104661840 B   *   9/2017   ........... B60G 11/113

OTHER PUBLICATIONS

International Search Report and Written Opinion regarding corresponding App. No. PCT/IB20/00759; dated Mar. 25, 2021.

*Primary Examiner* — Toan C To (57) ABSTRACT

A leaf spring vehicle suspension system includes a chassis rail and an axle. The suspension system also includes a first stage leaf spring. The suspension system further includes a second stage leaf spring. The suspension system yet further includes a third stage leaf spring operatively coupled at a first end and a second end to the chassis rail, wherein the first stage leaf spring is located below the third stage leaf spring and the second stage leaf spring is located below the first stage leaf spring. The suspension system also include a spacer in abutment with a leaf spring, wherein the spacer is formed of at least one composite material.

11 Claims, 7 Drawing Sheets

(51) Int. Cl.
*B60G 11/113* (2006.01)
*B60G 17/02* (2006.01)

(52) U.S. Cl.
CPC ...... *B60G 17/023* (2013.01); *B60G 2204/121* (2013.01); *B60G 2204/4502* (2013.01); *B60G 2206/428* (2013.01)

(56) References Cited

U.S. PATENT DOCUMENTS

| | | | | |
|---|---|---|---|---|
| 8,317,211 | B1* | 11/2012 | Ryshavy | B60G 9/003 |
| | | | | 280/124.175 |
| 8,480,108 | B2* | 7/2013 | Ryshavy | B60G 11/113 |
| | | | | 280/124.175 |
| 9,776,467 | B1* | 10/2017 | Gaw | B60G 11/10 |
| 9,969,229 | B2* | 5/2018 | Soles | B60G 11/10 |
| 10,286,742 | B2* | 5/2019 | Chen | F16F 1/30 |
| 10,826,742 | B2 | 11/2020 | Chen et al. | |
| 2014/0048988 | A1* | 2/2014 | Soles | B60G 11/10 |
| | | | | 267/36.1 |
| 2015/0165851 | A1 | 6/2015 | Dilworth et al. | |
| 2017/0305225 | A1 | 10/2017 | Soles | |
| 2019/0078636 | A1 | 3/2019 | Yano et al. | |
| 2019/0078637 | A1* | 3/2019 | Chihara | B60G 11/04 |

\* cited by examiner

COMPOSITE SPACER FOR LEAF SPRING SUSPENSION

CROSS-REFERENCE TO RELATED APPLICATIONS

This application is a U.S. National Stage of International Patent Application Serial No. PCT/IB2020/000759 filed Sep. 18, 2020, which claims priority to U.S. Provisional Patent Application Ser. No. 62/902,126, filed Sep. 18, 2019, the disclosures of which are incorporated by reference herein in their entireties.

FIELD OF THE INVENTION

This invention relates generally to leaf spring suspension systems for vehicles and, more particularly, to a composite spacer for such suspension systems.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

One effort to address the problems associated with other suspension systems employs a parallel leaf spring arrangement to provide a second stage spring rate of the system. Additionally, many assemblies have multiple spring plates that make up one or both of the stages. In today's marketplace, many vehicle manufacturers desire weight reduction to assist in fuel efficiency efforts. Unfortunately, the additional spring stage and multiple plates associated with one or both stages add weight to the overall assembly, and therefore the vehicle.

SUMMARY OF THE INVENTION

According to one aspect of the disclosure, a leaf spring vehicle suspension system includes a chassis rail and an axle. The suspension system also includes a first stage leaf spring. The suspension system further includes a second stage leaf spring. The suspension system yet further includes a third stage leaf spring operatively coupled at a first end and a second end to the chassis rail, wherein the first stage leaf spring is located below the third stage leaf spring and the second stage leaf spring is located below the first stage leaf spring. The suspension system also include a spacer in abutment with a leaf spring, wherein the spacer is formed of at least one composite material.

According to another aspect of the disclosure, a leaf spring vehicle suspension system is provided. The suspension system includes a chassis rail. Also included is an axle. Further included is a first stage leaf spring. Yet further included is a second stage leaf spring. Also included is a third stage leaf spring operatively coupled at a first end and a second end to the chassis rail, wherein the first stage leaf spring is located below the third stage leaf spring and the second stage leaf spring is located below the first stage leaf spring. Further included is a spacer in abutment with a leaf spring. Yet further included is at least one compression limiter disposed within the spacer.

These and other advantages and features will become more apparent from the following description taken in conjunction with the drawings

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
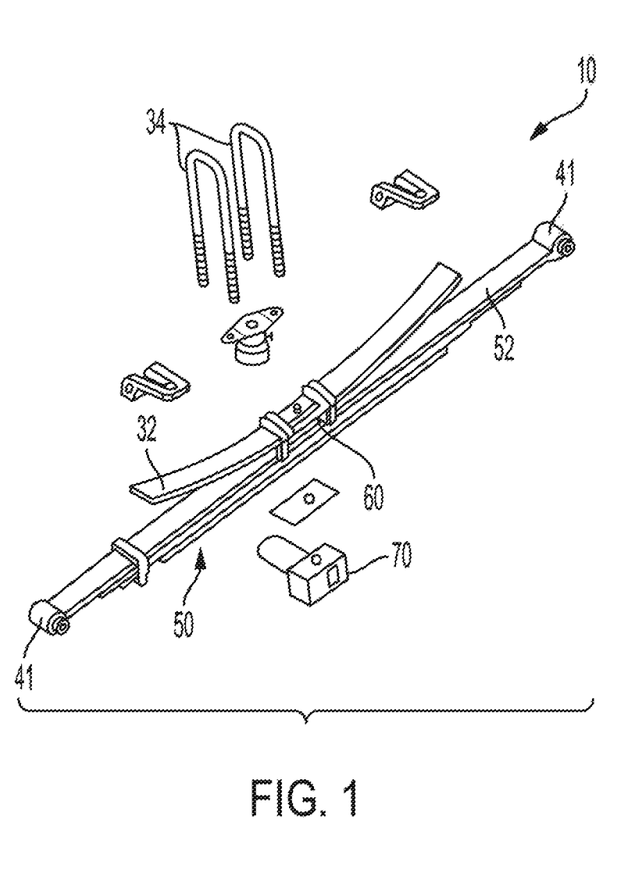
FIG. 1 is a perspective, partially disassembled view of a leaf spring suspension system.
Figure 2:
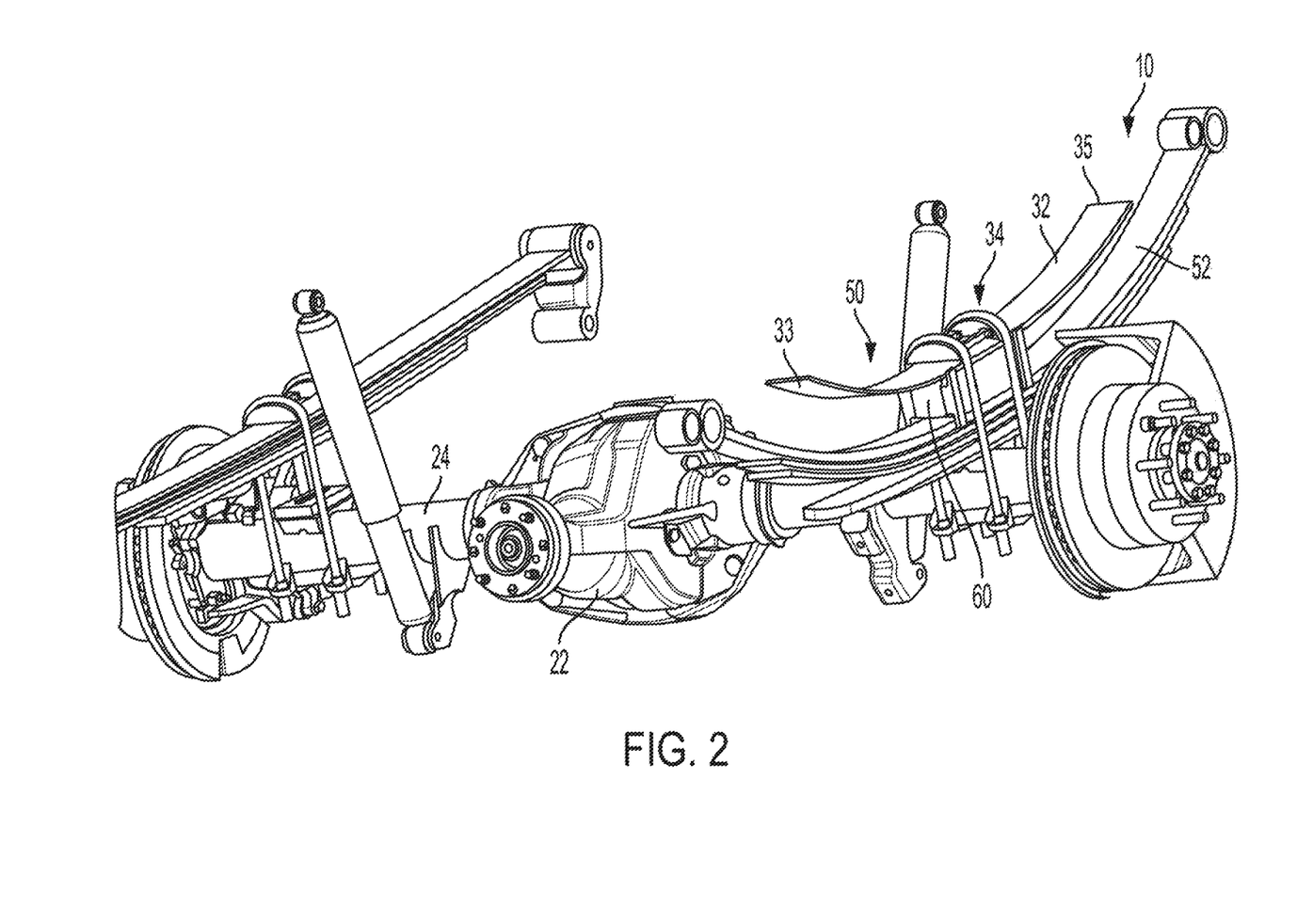
FIG. 2 is a perspective view of the leaf spring suspension system.

Referring to FIGS. 1 and 2, the embodiments disclosed herein are utilized in a vehicle suspension system 10 having a chassis having substantially parallel chassis rails (not shown). The chassis rails are coupled to each another by one or more cross braces (not shown). A differential drive arrangement 22 is fixedly coupled to the chassis and converts the rotary motion of a drive shaft (not shown) to substantially orthogonal rotary motion at axle 24. The axle 24 includes an associated pair of universal joints (not specifically designated) that are arranged to be proximal and distal with respect to the differential drive arrangement 22. Thus, the axle 24 has an associated longitudinal axis to accommodate transaxial motion. It is to be appreciated that the axle 24 refers to a pair of half shafts in some embodiments. The half shafts may be disposed within a single sleeve or uncovered.

Figure 3:
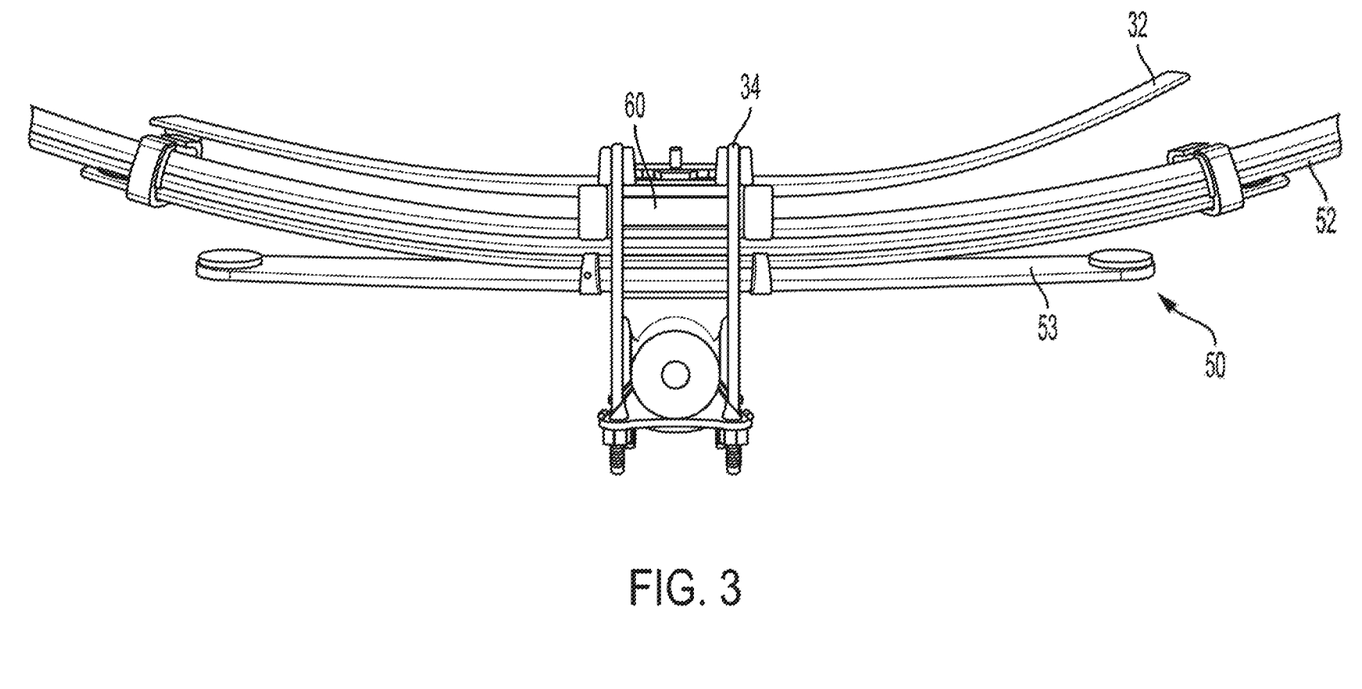
FIG. 3 is a side view of the leaf spring suspension system.

As shown in FIGS. 1-3, the vehicle suspension system 10 includes a leaf spring arrangement 50 that includes a third stage leaf spring 32. The leaf spring arrangement also includes a first stage leaf spring 52 and a second stage leaf spring 53 (FIG. 3), with the leaf springs 32, 52, 53 operatively coupled to each other proximate the axle 24 of the vehicle suspension system 10. The leaf springs 32, 52, 53 may be formed of metal (e.g., steel) or a composite material to achieve a lighter weight of the system.

Disposed between the first end 33 and the second end 35 of the leaf spring 32 is a clamping assembly 34 to operatively couple the third stage leaf spring 32 and the first stage leaf spring 52 to each other and to the axle 24. The clamp group assembly 34 is a pair of substantially U-shaped rods that are similarly shaped in the illustrated embodiment. However, it is to be appreciated that alternative shapes of the clamping assembly components are contemplated. In some embodiments, the clamp group assembly 34 is located proximate a lengthwise midsection of the first stage leaf spring 52. In some embodiments, the clamp group assembly 34 is centrally located at an approximate lengthwise midsection of the third stage leaf spring 32.

The third stage leaf spring 32 is operatively coupled at a first end 33 and a second end 35 to the chassis rail in some embodiments. In particular, the first stage leaf spring 52 is coupled to the chassis rail in a fixed manner with any suitable coupling element. In some embodiments, the first stage leaf spring 52 is operatively coupled, at least in part, to the chassis rail with an eye spring bushing arrangement. However, the third stage leaf spring 32 may be shorter than a first stage leaf spring 52 and not necessarily coupled to the chassis rail in the above-described manner. For purposes of discussion, only third stage leaf spring 32 has been described in detail, but it is to be appreciated that a corresponding leaf spring is located on an opposing side of the chassis proximate a different chassis rail.

The above-described first stage leaf spring 52 may be referred to as a "semi-elliptical" spring configured as an arc-shaped length segment. It is to be appreciated that the first stage leaf spring 52 is formed of one or more leaf springs, where a stacked spring embodiment is a first stage leaf spring assembly. Similarly, the first stage leaf spring 52 is formed of one or more leaf springs, where a stacked spring embodiment is a second stage leaf spring assembly.

As shown in FIGS. 1-3, a middle spacer 60 is disposed between the first stage leaf spring 52 and the third stage leaf spring 32. The middle spacer 60 maintains a desired spacing between the third stage leaf spring 32 and the first stage leaf spring 52 and assists with ensuring overall suspension response characteristics that are based on the leaf springs 32, 52. Additionally, the middle spacer 60 prevents inter-leaf contact of the springs.

Figure 4:
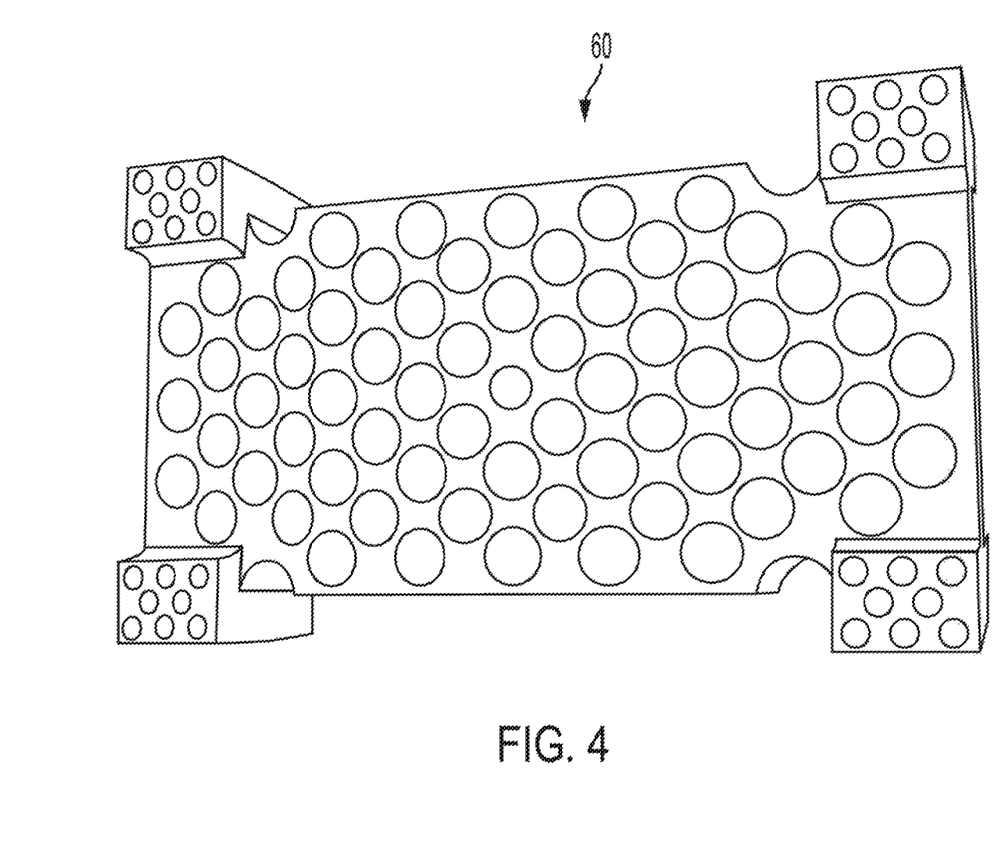
FIG. 4 is a perspective view of a composite middle spacer for the leaf spring suspension system.
Figure 5:
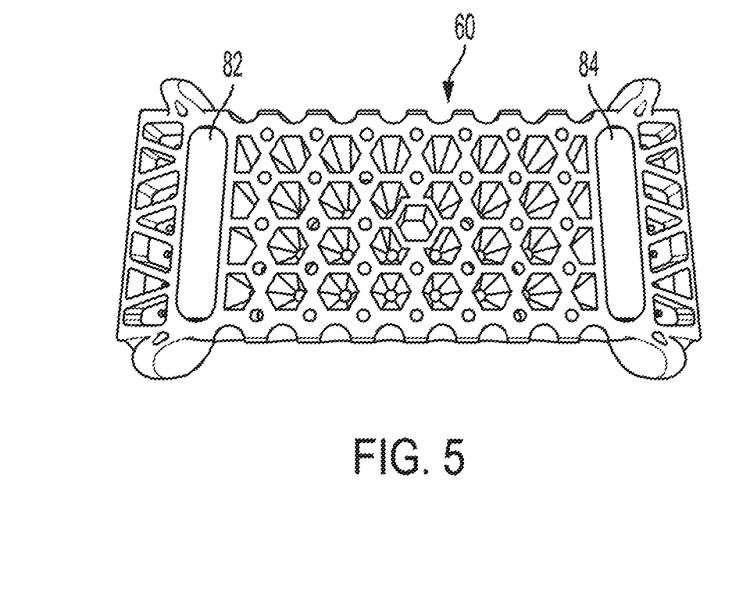
FIG. 5 is a perspective view of the composite middle spacer with compression limiters disposed therein.
Figure 6:
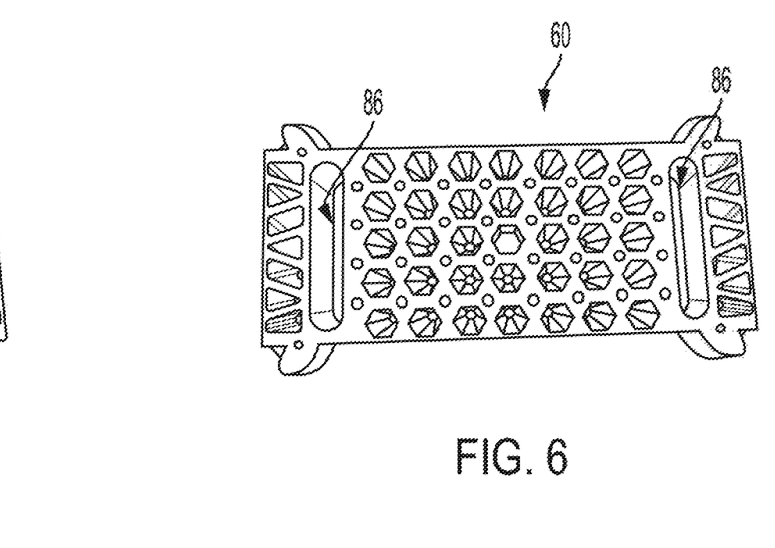
FIG. 6 is a perspective view of the composite middle spacer with the compression limiters removed.
Figure 9:
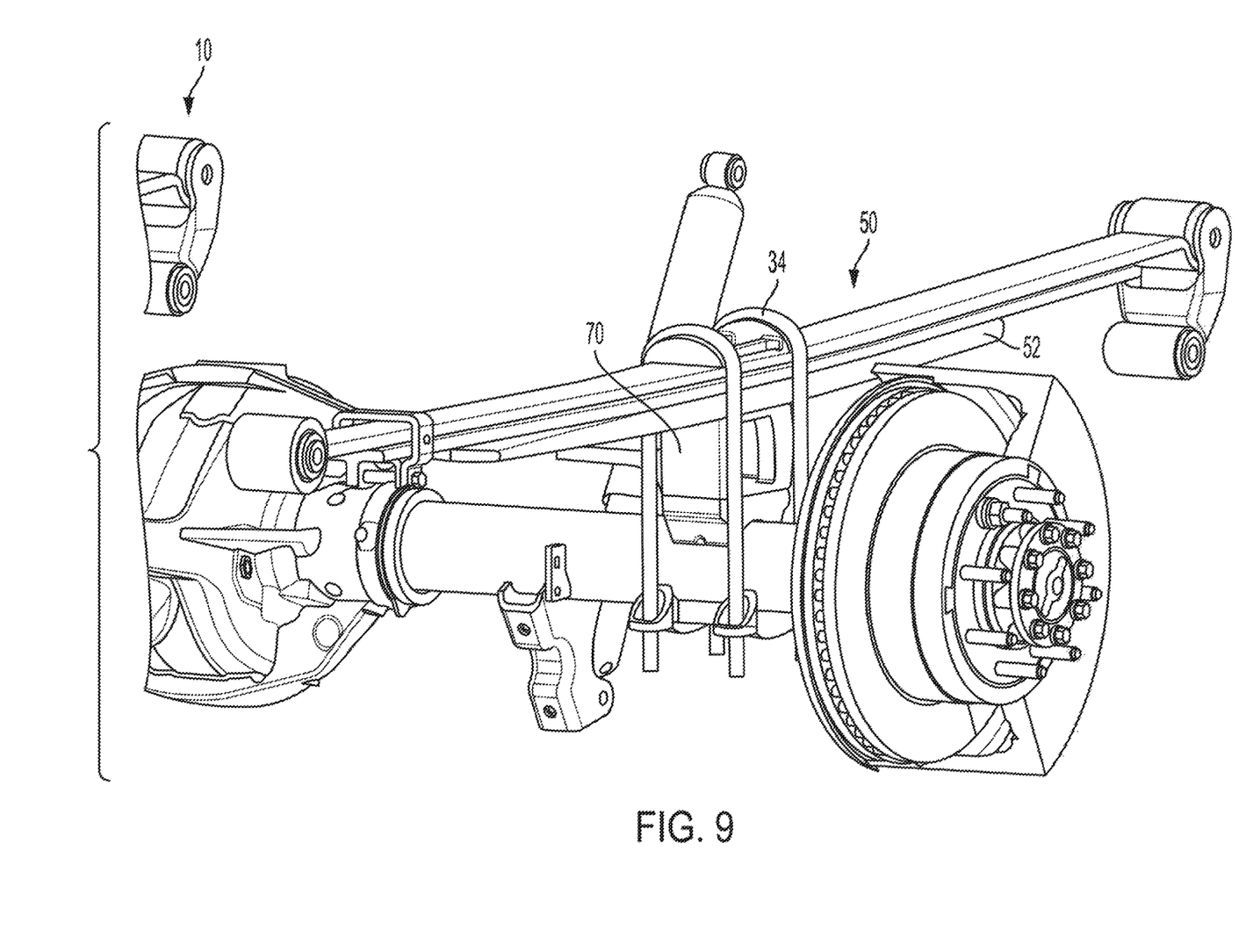
FIG. 9 is a perspective view of the leaf spring suspension system with a bottom composite spacer.

Referring now to FIG. 4, an interior portion of the middle spacer 60 is illustrated. The middle spacer 60 is formed of one or more composite materials that results in a lighter spacer in comparison to traditional metal spacers. Weight reduction achieved through the use of different materials is particularly beneficial to overall vehicle weight reducing efforts. As shown in FIG. 9, a bottom spacer 70 that is located beneath the first and second stage leaf spring 52 may also be formed of composite material(s). In addition, top spacers that are located above the third stage leaf spring 32 may benefit from a composite material design. As illustrated, the spacer 60 includes a plurality of apertures to reduce weight, but it is contemplated that a solid spacer may be employed in other embodiments.

Referring to FIGS. 5-8, the middle spacer 60 is shown according to another aspect of the disclosure, but it is to be appreciated that the features described in relation to the middle spacer 60 may be applicable to the previously described bottom spacer 70 or top spacer. The bottom spacer 70 can determine the ride height of the vehicle. To further reduce the mass of the middle spacer 60—and therefore the overall suspension system 10—one or more compression limiters are disposed in the middle spacer 60. In the illustrated embodiment, a first compression limiter (hollow) 82 and a second compression limiter (solid) 84 are disposed in respective slots 86 of the middle spacer 60. It is to be appreciated that fewer or more compression limiters may be employed in some embodiments. The solid compression limiters 82, 84 are located in high clamp load regions of the clamping assembly 34. Introduction of the compression limiters 82, 84 within the middle spacer 60 allows for the use of lesser grade composites. The fasteners of the clamping assembly 34 do not go through the compression limiters 82, 84 within a through hole, in contrast to prior spacer designs. Therefore, the U-shaped clamping assembly component(s) span over the limiter itself. The composite material of the spacer 60 now acts as a place-holder for the compression limiters and the limiters are held in place mainly by the clamping load exerted by the clamping assembly 34.

Figure 7:
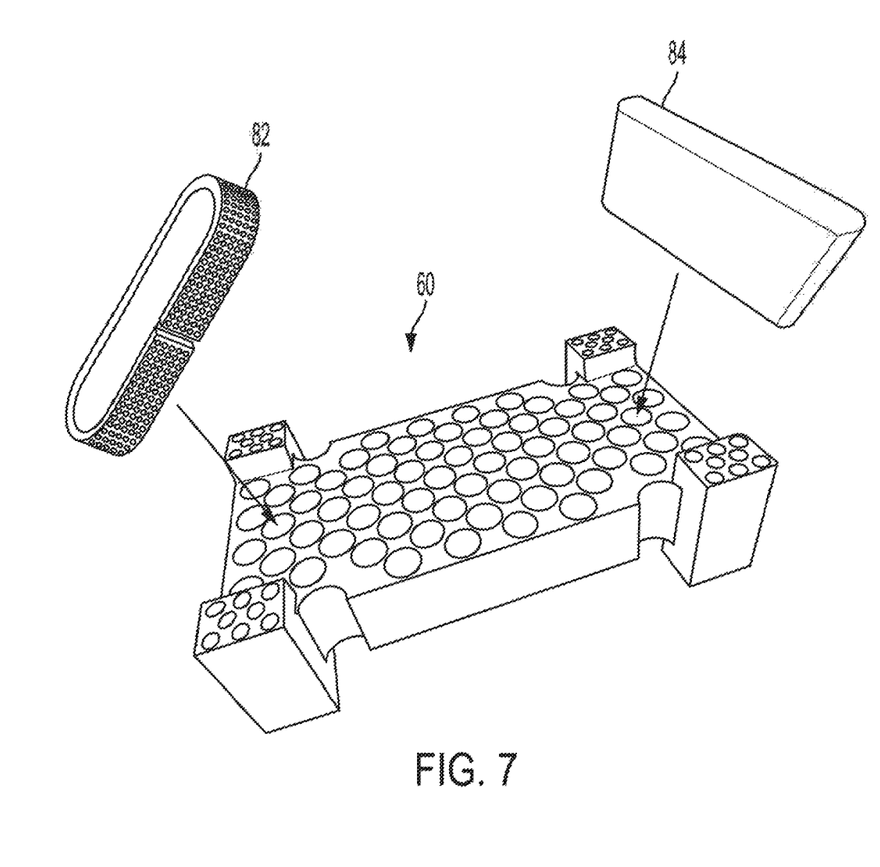
FIG. 7 is a perspective view of the composite middle spacer illustrating another aspect of the disclosure.
Figure 8:
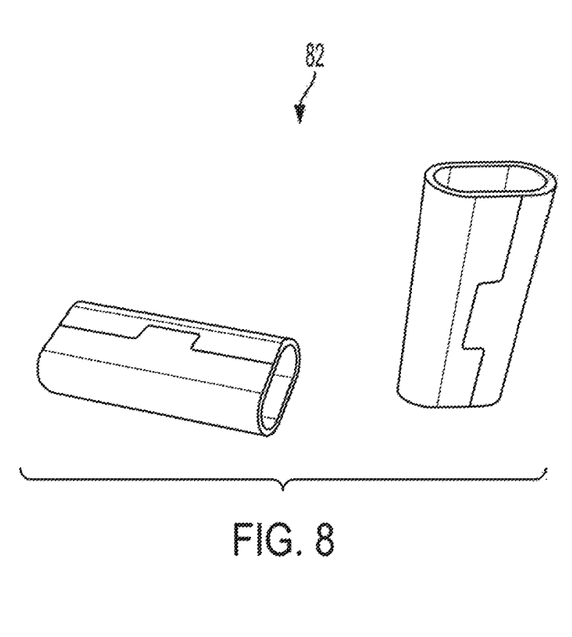
FIG. 8 is a perspective view of hollow compression limiters.

The composite spacer 60 can be fitted with a solid core compression limiter 84 for ultimate clamp loads because the hardware does not pass through the limiter as in most over-molded products where the limiter is used around the fastener to stop crushing, i.e. a valve cover or timing cover. As shown in FIGS. 7 and 8, the compression limiters can be further light-weighted by using a hollow core compression limiter 82 as opposed to a solid core compression limiter 84 where crush loads permit in some embodiments, but as shown in FIG. 7, a solid core compression limiter may be utilized in some embodiments.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

The invention claimed is:

1. A leaf spring vehicle suspension system comprising:
    a chassis rail;
    an axle;
    a first stage leaf spring;
    a second stage leaf spring;
    a third stage leaf spring operatively coupled at a first end and a second end to the chassis rail, wherein the first stage leaf spring is located below the third stage leaf spring and the second stage leaf spring is located below the first stage leaf spring;
    a spacer in abutment with at least one of the first stage leaf spring, the second stage leaf spring, and the third stage leaf spring, wherein the spacer is formed of at least one composite material; and
    at least one compression limiter disposed within the spacer, wherein the compression limiter is a hollow component.

2. The system of claim 1, wherein the compression limiter is formed of an alloy material.

3. The system of claim 1, wherein the spacer is located between the first leaf spring and the third leaf spring.

4. The system of claim 1, wherein the spacer is located between the first leaf spring and the second leaf spring.

5. A leaf spring vehicle suspension system comprising:
    a chassis rail;
    an axle;
    a first stage leaf spring;
    a second stage leaf spring;
    a third stage leaf spring operatively coupled at a first end and a second end to the chassis rail, wherein the first stage leaf spring is located below the third stage leaf spring and the second stage leaf spring is located below the first stage leaf spring;
    a spacer in abutment with at least one of the first stage leaf spring, the second stage leaf spring, and the third stage leaf spring, the spacer extending from a top side to a bottom side in a vertical direction, wherein the spacer defines at least one slot extending in a longitudinal direction parallel to the vertical direction of the spacer; and at least one compression limiter disposed within the at least one slot of the spacer.

6. The system of claim 5, wherein the spacer is formed of at least one composite material.

7. The system of claim 5, wherein the compression limiter is formed of an alloy material.

8. The system of claim 5, wherein the compression limiter is a hollow component.

9. The system of claim 5, wherein the compression limiter is a solid component.

10. The system of claim 5, wherein the spacer is located between the first leaf spring and the third leaf spring.

11. The system of claim 5, wherein the spacer is located between the first leaf spring and the second leaf spring.

* * * * *